July 27, 1943.       E. F. FLINT       2,325,239
MICROSCOPE
Filed May 23, 1941
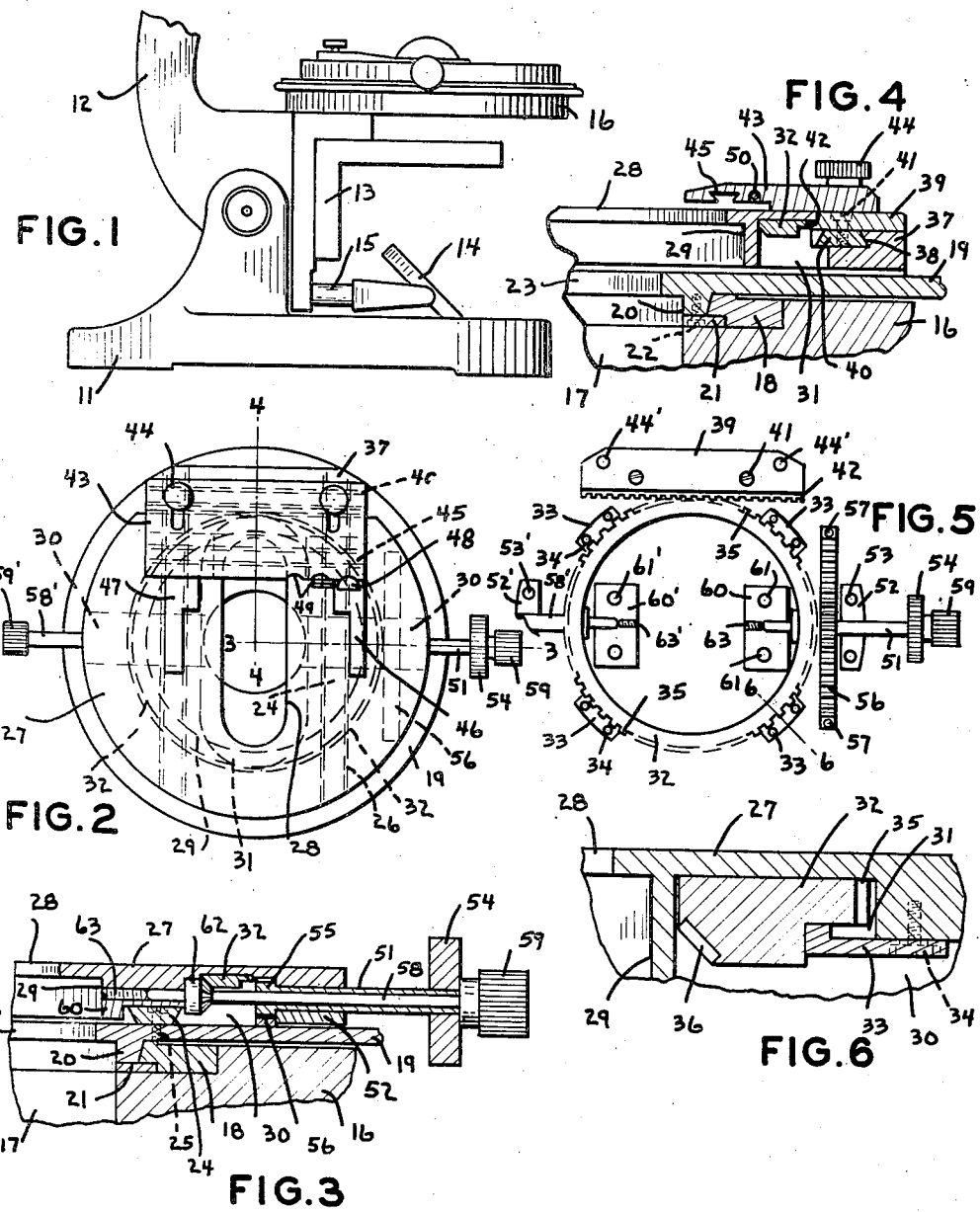
EDWARD F. FLINT
INVENTOR Patented July 27, 1943

2,325,239

UNITED STATES PATENT OFFICE 2,325,239

MICROSCOPE

Edward F. Flint, Brighton, N. Y., assignor to Bausch & Lomb Optical Company, Rochester, N. Y., a corporation of New York Application May 23, 1941, Serial No. 394,832

11 Claims. (Cl. 88—40)

The invention relates to optical instruments and more particularly has reference to a microscope and the specimen stage associated therewith.

One important object of my invention is to provide a novel type of revolving stage for use with a microscope wherein the simple and compact design of the stage leads to its readily controlled operation and facilitates microscopic examination.

Another object is to devise means for operating the slides of a revolving stage of the type having superposed slides, which means are driven from shafts carried by the stage for rotation about an axis which is parallel to a central axis of the stage lying in the plane of the stage surface, while still another object is to employ a mechanical design whereby slides of the character described may be operated from concentric actuating buttons.

A further object of the invention is to make use of a construction which employs a ring gear for operating one of the slides of a revolving microscope stage.

Yet a further object of my invention is to provide a microscope stage of the kind having superposed slides wherein the surface of the upper slide, which is carried on the lower slide, is flush with the latter.

With these and other objects in view which may be incident to my improvements, the invention consists in the parts and combinations to be hereinafter set forth and claimed, with the understanding that the several necessary elements comprising the invention may be varied in construction, proportion and arrangement without departing from the spirit of the invention or exceeding the scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

With special reference to the drawing:

Figure 1 is a partial side elevation of a microscope which is equipped with my improved specimen stage.

Figure 2 is a plan view of the specimen stage.

Figure 3 is a partial vertical section of the stage and is taken on the line 3—3 of Figure 2.

Figure 4 is a partial vertical section similar to Figure 3 but taken on the line 4—4 of Figure 2.

Figure 5 is a plan view showing the operating mechanism for the slides of the stage.

Figure 6 is a sectional elevation on the line 6—6 of Figure 5.

Throughout the different views of the drawing, I have used similar reference numerals to refer to like parts and have shown the base structure of a microscope, in Figure 1, upon which my improved stage is mounted. The microscope therein shown comprises the usual stand 11 to which the usual support arm 12 is fixedly or pivotally secured. Arm 12 is adapted to carry the objectives and eyepiece or eyepieces for the instrument in normal overhanging relation to the stage of the microscope. Suitable coarse and fine adjustment mechanisms, not shown, for focusing the instrument are adapted to be associated therewith.

A bracket 13 of well known construction is suitably secured to the support arm 12 for the purpose of supporting the usual substage equipment employed in microscopic examination. Also shown associated with the instrument of Figure 1 is a suitable mirror 14 which may be pivotally supported on the arm 15 fixed to the support arm 12 in the manner shown or which may be pivoted between the feet of the stand 11.

The arm 12 has secured thereto, by any well known means, a conventional stage support 16 adapted to have the microscope stage mounted thereon. In my invention, the stage comprises a stage plate on which are two superposed slides, the upper one of which carries a specimen holder. These slides, as will presently appear, are operated from concentric actuating buttons fixed to shafts which have their axis of rotation parallel with a central axis of the stage.

While I am aware that stages having superposed slides have been operated from concentric actuating buttons, constructions heretofore employed have possessed serious defects. Prior devices have usually employed a pinion fixed on a shaft which is concentric with a partially threaded shaft. These shafts are carried by one of the slides and are so arranged that the pinion cooperates with a rack to move one slide while the threaded shaft is engaged with a nut fixed on a second slide so as to move the latter on rotation of the threaded shaft. Mechanism of this type, due to its peculiar design, can only be located towards the rear or the front of the stage. Moreover, the surface area of a stage using such mechanical means must be greatly enlarged over that of the normal revolving stage in order to permit movement of its slides by amounts sufficient to allow satisfactory examination of a specimen on the stage.

In prior construction practices, the portion of the support arm which is at the level of the stage must be located at a considerable distance from the center of the latter so as to allow the stage to revolve freely. This necessitates the use of a support arm having an overhanging portion longer than that ordinarily used in microscope construction so that the optical axis of the optical system, which is supported on the end of the arm over the stage, will pass through the stage center. Under these circumstances, even where the support arm is made relatively heavy and thick, the bending moment added to the arm by the increased overhang makes it extremely difficult to maintain that critical focus of the instrument as well as that stability of its field of view so essential to precise observation and examination. Thus the effects of improvements heretofore employed to provide facile operation for a microscope stage have, in general, been more than nullified by disadvantages which have been created in other parts of the instrument.

In overcoming the defects just above noted, I make use of a stage construction now to be detailed. The stage itself is, as already pointed out, carried on a stage support 16. This latter is provided with a suitable central opening 17 of circular shape which provides a light passageway and also with a cutaway portion in which is seated a conventional centering ring 18 as best shown in Figures 3 and 4. The usual centering screws extend through the stage support and engage the centering ring 18 to permit the latter to be centered in a manner well understood by the art. As centering screw means of this character are conventional and well known, a view illustrating such means has been omitted from the drawing.

The centering ring 18 forms a bearing on which a stage plate 19 is rotatably supported. To this end, the stage plate 19 is provided with a depending hub 20 which is engaged with the interior of the centering ring as best shown in Figures 3 and 4. The stage plate 19 is retained for rotation on the centering ring by a retaining ring 21 secured to the end of the hub 20 by screws 22. This ring 21 has a portion which engages a cutaway portion on the centering ring 18 at a location adjacent the hub 20 as best shown in Figure 4. It will be obvious that the just described construction provides a means for rotatably mounting the stage plate 19. Conventional locking means, not shown, for engaging the retaining ring 21 and holding the stage plate 19 at a desired location may be secured to the lower surface of the centering ring 18, such a lock being controlled by actuating means adapted to extend beyond the edge of the stage plate.

Preferably, stage plate 19 is circular and has a greater diameter than the stage support 16 which is also generally of circular shape. However, as will become apparent, the operating principles of the mechanism to be disclosed are in no wise dependent upon the shape of these just mentioned elements or upon the slides to be hereinafter described. The stage plate 19 is provided with a suitable central opening 23 which cooperates with the opening 17 in the stage support to permit the passage of light through the stage.

It has been noted that the stage comprises the stage plate 19 and a pair of slides which are superposed thereon. In order to mount such slides, use is made of dovetail guides 24 which are secured to the upper surface of the stage plate 19 by suitable fastenings 25 as shown in Figures 2 and 3. These guides, which extend across the stage plate 19 in a direction normal to a diameter thereof are adapted to be engaged by undercut grooves 26 formed in the under side of the top of a main slide 27.

The slide 27, which may be of any suitable shape, is relatively thick and is provided with an elongated central opening 28, the longitudinal axis of this opening being parallel to the longitudinal axis of the guides 24 and grooves 26 when the slide is mounted on the stage plate. Opening 28 is undercut as indicated at 29 and extends entirely through the slide 27 to provide a light passageway.

As may be noted, the lower section of the slide 27 is provided with cutaway portions 30, the purpose of which will be presently explained. Each cutaway portion, which may be of varying depth but of substantially constant width, opens at one end into the undercut edge 29 of the central opening in the slide and extends outwardly through the outer edge of the slide 27. The location of each cutaway portion 30 is such that its longitudinal axis is parallel to a diameter of the stage plate which is normal to the axes of the guides 24. Under such circumstances, the grooves 26 in the slide will only extend from a side of each cutaway portion 30 to an end of the slide 27 as it is indicated in Figure 2.

Slide 27 is also provided with a circular shaped recess 31 formed in its under surface. The edges of recess 31 have their centers at the center of the slide. This recess opens into the cutaway portions 30 where it crosses them and has its inner surface located above each cutaway portion as shown in Figure 3. A ring gear 32 is rotatably mounted within the recess 31 by means of gibs 33 secured to the under surface of the slide 27 by screws 34. This ring gear is provided with a suitable shoulder which is seated on the squared end of each gib in the manner detailed in Figure 6 so that the gear is rotatably supported on the gibs which are carried from the slide 27. By forming the screw holes in the gibs of a greater diameter than the screws 34, the gibs may be made adjustable so that the gear 32 can be readily centered.

As may be observed, the ring gear is provided with two sets of teeth, one set 35 which is normal to the top of the slide 27 and another set 36 which is inclined thereto. The function of the ring gear 32, which will shortly become apparent, is to drive the second slide associated with the stage and for this reason is in operating engagement with such slide.

Slide 27 is of a general circular outline except for a more or less rectangular extension 37 which is best shown in Figures 2 and 4 and upon which the second slide of the stage is mounted. The short dimension of the extension 37 projects outwardly from the slide 27 in the direction of the guideways 26 while its long dimension is normal to these grooves or guideways. A dovetail groove 38 is cut in the upper surface of the extension portion 37 to extend lengthwise of the extension. This construction permits a second slide 39 to be superposed on the slide 27 in sliding relation thereto by providing the second slide with a guide 40 adapted to be engaged with the groove or guideway 38. Guide 40 is secured to the slide 39 by means of screws 41. The mounting just described allows the slide 39 to be moved in a direction which is normal or transverse to the direction of motion of the main slide 27.

It is important to observe that the upper surface of the extension portion 37 is depressed with respect to the upper surface of the main portion of the slide 27, that is to say, the main portion of the slide 27 is thicker than the extension 37 thereof. The just mentioned difference in thickness is equal to the thickness of the second or transverse slide 39 so that the upper surface of the latter will be flush with the upper surface of the main portion of the slide 27. By setting the transverse slide 39 in the main slide 27, I am enabled to reduce the overall thickness of the stage to an amount where interference of the objectives carried by a revolving nosepiece will be avoided when the nosepiece is rotated to change from one objective to another.

As best shown in Figures 4 and 5, the transverse slide 39 is provided with rack teeth 42 along the forward edge thereof. Teeth 42 are adapted to engage with the teeth 35 on the ring gear 32, these latter teeth being arranged in operating relation to the rack. It will be apparent that movement of the transverse slide may be effected by rotation of the ring gear 32, the direction of such movement of the slide being in accordance with the direction of rotation of the ring gear.

A conventional type of specimen holder 43 is adapted to be detachably mounted on the surface of the transverse slide. This mounting is carried out by means of screws 44 which extend through the base of the specimen holder and engage tapped holes 44' in the slide 39. The specimen holder 43 is formed with a projection which overhangs the main portion of the slide 27 in the manner shown in Figure 4. A suitable groove 45 is cut in the under surface of this overhang to extend lengthwise of the specimen holder so as to provide a guideway for slidably mounting the specimen engaging brackets or fingers 46 and 47 adjacent the upper surface of the slide 27.

Each finger 46 and 47 is provided with a dovetail guide on its upper surface which engages with the groove 45 so that the finger is slidably mounted. Finger 46 has a conventional pivotal lock mechanism 48 which is engageable with either of the notches 49 formed in the overhanging portion of the specimen holder as shown in Figure 2. This permits the finger 46 to be maintained in any one of several positions of adjustment.

The other finger 47 is connected to a spring 50, shown in Figure 4, which constantly urges finger 47 towards the finger 46. One end of spring 50 is secured to the finger 47 while the other end is secured near the end of the specimen holder adjacent the finger 46, conventional fastening means, which are not illustrated, being employed for this purpose. Spring 50 is located in a channel which, as disclosed, is formed in the specimen holder parallel to the groove 45. Usually a suitable stop is employed to limit the travel of the finger 47 towards the finger 46. By these means specimens or specimen slides of different sizes may be accommodated between the fingers of the specimen holder which engages such in the conventional manner of holders of this character and supports the same upon the surface of my improved stage.

In driving the ring gear 32 and for moving the slide 27, I make use of a hollow shaft 51 which extends within one of the cutaway portions 30 in the slide 27 and is rotatably journaled between the top of the slide and a bearing cover 52 secured to the slide by screws 53 in the manner illustrated in Figures 3 and 5. Fixed on the exterior end of the shaft 51 is a hollow operating button 54 while a pinion 55 is secured on the inner end of this shaft within the cutaway portion 30. Pinion 55 is arranged to engage with a rack 56 secured to the stage plate 19 by screws 57. Rack 56 is located in a position such that it is parallel to the guides and guideways for the main slide 27. It is obvious that suitable rotation of the actuating button 54 will cause desired forward or rearward adjustment of the main slide 27 and also similar movement of the transverse slide 39 which is carried thereon.

The hollow shaft 51 assists in supporting the drive means for the ring gear and to this end has a shaft 58 rotatably journaled therein. Shaft 58 extends beyond both ends of the shaft 51. An operating button 59, of smaller diameter than the button 54, is fixed on the outer end of the shaft 58 adjacent the button 54. The other end of the shaft 58 is rotatably journaled between the top of the slide 27 and a bearing cover 60 which latter is secured to the slide by screws 61. Fixed on the shaft 58 is a bevel gear or pinion 62 which is in driving engagement with the teeth 36 of the ring gear 32. The journal provided by the bearing cover 60 and the top of the slide 27 is threaded at its end adjacent the central opening 28 in the slide to receive a screw 63. Screw 63 provides means for assuring that pinion 62 is held in driving engagement with the ring gear 32 and permits longitudinal adjustment of the shaft 58 after the stage has been assembled.

If desired, similar shafting and drive means for both the slide 27 and the ring gear 32 may also be mounted in the slide 27 diametrically opposite to the means just disclosed. Generally, however, two separate drive means are only employed for driving the ring gear. The second drive means for the ring gear is substantially like the mechanism just described for operating this gear and the slide 27 with the exception that it makes use of only one drive shaft which may, for the sake of appearance, be of a diameter substantially the same as the outer diameter of the hollow shaft 51.

As shown in Figures 1, 2, and 5, the second drive means for the ring gear comprises a shaft 58' which extends into the cutaway portion 30 opposite to the shaft 58 and is journaled between the top of the slide 27 and the two bearing covers 52' and 60' which are respectively secured to the slide 27 by screws 53' and 61'. Shaft 58' has a pinion, not shown but substantially like the pinion 62, fixed thereto and in driving engagement with the ring gear 32. Use is also made of a longitudinal adjusting screw 63' similar to the screw 63 but associated with the bearing cover 60' for maintaining the shaft 58' and its pinion in driving relation to the ring gear. Shaft 58' also has a suitable operating button 59' fixed on its outer end.

Operation of either button 59 or 59' will obviously drive the ring gear 32 and cause the same to move the transverse slide 39 independently of the main slide 27 while the latter slide may be moved by the actuation of the button 54. Thus it will be appreciated that I am able to selectively position either the main slide 27 or the transverse slide 39 although the transverse slide which is carried on the main slide 27 will be moved during movement of the latter. Due to this construction, similar movement with respect to a microscope objective is consequently obtained for a specimen engaged by the holder 43. The extent of any movement of the slides may be determined by the use of customary scales and index markings associated with the stage plate 19 and the two slides of the stage. Likewise, a scale may be provided on the stage plate 19 to indicate, with respect to a suitably fixed index, the amount of rotation of the stage.

In the construction which I have disclosed, it should be observed that I employ coaxially positioned drive shafts for operating the slides of the stage. These shafts are located so that their axes are parallel to a central axis of the stage which lies in the stage surface. Where the stage is of the circular type, such a central axis will be a diameter thereof. While all of the shafts are coaxial to each other, it may be noted that shafts 51 and 58 are also concentric. This feature, namely, the location of the drive shafts along a central axis of the stage, permits the design of a stage of normal size and weight which possesses the advantages of operation from concentric operating buttons conveniently located to the hand of an observer using the microscope. Another feature in the location of the buttons and the drive shafts resides in their adaptability for use as handle means for revolving the stage.

It may be observed that while suitable rotation of the shaft 58 and button 59 will move the transverse slide 39 in a desired direction, the rotation of the ring gear 32 will cause the shaft 58' and its button 59' to be rotated in a direction which is opposite to that of the shaft 58 and its button 59. In other words, movement of the transverse slide in a particular direction may be effected when the stage is in the position shown in Figure 2 by rotating either the button 59 or 59' in suitable but opposite directions to each other.

However, the button 59' may be rotated in a direction similar to that of the button 59 to cause like relative movement of the transverse slide 39 with respect to the main slide 27 if the stage, as viewed in Figure 2, is revolved so that the button 59' is to the right of a fixed dividing line which passes through the center of the stage and is normal to the support arm 12. Similarly, the rotation of either button in the same direction when it is located on the left of such a fixed dividing line will assure movement of the transverse slide in corresponding relative direction with respect to the slide 27. This inherent feature in my mechanism is of importance in facilitating examination of an object as it assures a microscopist that the same relative movement between the slides 39 and 27 will always occur by turning an actuating button for the ring gear on his right in a particular direction with his right hand while also movement of the slide 39 in a particular direction will always take place if a button on his left is turned in a particular direction.

From the foregoing it will be appreciated that I have devised a novel stage which is easily operated and controlled. At the same time, it may be noted that I have provided a stage which while of a compact nature may be constructed to have a desired surface area and a suitable rigidity. It is to be observed that these advantages have been obtained without sacrifice of any of those essentials which are necessary to good instrument design and which lead to the stability of various parts of a miscroscope.

I claim:

1. In a microscope having a support arm, a stage support on said arm, a stage plate rotatable on said stage support, a slide slidably mounted on said plate, said stage support, plate and slide each provided with a central opening for the passage of light, a second slide mounted on said first slide for sliding movement in a direction transverse to the direction of movement of the first slide, specimen holding means carried by said second slide, gear teeth on said second slide, gear means rotatably carried by said first slide in operative engagement with the gear teeth on said second slide for moving the latter, rack means on said plate, independently operable shafts rotatably journaled in said first slide, pinion means fixed on one shaft in operative relation with said rack means and other pinion means fixed on a different shaft in operative relation with said gear means whereby to selectively move said first slide and rotate said gear means in accordance with the rotation of their respective shafts.

2. The combination in a microscope having a support arm with a stage support thereon of a stage which comprises a stage plate rotatably mounted on said stage support, a slide superposed on said plate and a second slide superposed on said first slide, said first slide slidable on said plate and said second slide slidably mounted on said first slide for movement in a direction which is transverse to the sliding movement of the first slide, said stage support, plate and first slide provided with openings for the passage of light through the stage, specimen holding means on said second slide, gear means on said second slide, means for moving said second slide having a ring gear rotatably and floatingly carried by said first slide in operative engagement with the gear means said second slide to move the same upon the rotation of said ring gear, rack means carried on said plate and independently operable pinion means carried by said first slide in operative relation with said ring gear and said rack whereby to selectively rotate said ring gear and to move said first slide.

3. A revolving microscope stage of the type which is rotatably mounted on a stage support carried by the microscope and which comprises a stage plate and superposed slides mounted on the plate, said plate having a hub portion rotatably mounted on said stage support, one slide slidable on said plate and a second slide slidable on said first slide for movement transversely of the first slide, specimen holding means carried by said second slide, said stage support, plate and first slide having central openings for the passage of light through the stage, gear means on said second slide, means for moving said second slide having a ring gear rotatably and floatingly carried by said first slide in operative engagement with the gear means on said second slide whereby to move the second slide upon the rotation of said ring gear, rack means on said plate, independently rotatable shafts journaled in said first slide and pinion means fixed on different shafts in operative relation to said ring gear and said rack whereby to move a selected slide upon the selective rotation of a shaft.

4. The combination with a microscope provided with a stage support of a stage plate rotatably mounted on said support, a slide slidably mounted on said plate, a second slide slidably mounted on said first slide for movement in a direction transverse to that of the first slide, specimen holding means on said second slide, said stage support, plate and first slide each having an opening for the passage of light, gear means on the second slide, a ring gear, gib means secured to said first slide in supporting relation to said ring gear whereby to rotatably mount said ring gear in operative engagement with the gear means on the second slide to move the latter in accordance with the rotation of said ring gear, rack means carried by said plate, and independently operable pinion means carried by said first slide in operating relation with said ring gear and said rack whereby to selectively rotate said ring gear and to move said first slide.

5. A revolving microscope stage of the type rotatable on a stage support of a microscope, said stage comprising a stage plate having a hub portion rotatably carried by said stage support, a slide slidably mounted on said plate, a second slide slidable on the first slide for movement in a direction transverse to that of the first slide, a rack on said second slide, specimen holding means carried by said second slide, said stage support, plate and first slide provided with openings for the passage of light through the stage, a ring gear having different sets of teeth, a plurality of gibs supporting said ring gear for rotation about an axis normal to the faces of said first slide, said gibs secured to said first slide at positions to hold one set of teeth of said ring gear in driving relation with the rack on said second slide, a second rack, said second rack mounted on said plate, and independently operable pinion means carried by said first slide in driving relation with another set of teeth on said ring gear and with said second rack whereby to cause desired movement of either slide.

6. A revolving microscope stage of the type rotatable on a stage support of a microscope, said stage comprising a stage plate, a hub on said plate rotatably mounted on said stage support, a slide slidably mounted on said plate, a second slide slidably mounted on said first slide for sliding movement transverse to that of the first slide, a rack on said second slide, specimen holding means on the second slide, said stage support, plate and first slide each provided with a central opening for the passage of light through the stage, said first slide having a recess in a surface thereof in surrounding relation to said central opening therethrough, a ring gear having different sets of teeth, gibs secured to said first slide and rotatably supporting said ring gear in said recess, one set of teeth on said ring gear in driving relation to said rack on said second slide, a second rack, said second rack mounted on said plate, said first slide provided with a cutaway portion into which said recess opens, concentric shafts independently rotatable of each other rotatably supported in said cutaway portion, a pinion on one shaft in driving engagement with a second set of teeth on said ring gear and a pinion on a second of said shafts in driving relation with said rack on said plate, said shafts extending beyond said plate and provided with hand operating buttons.

7. A revolving microscope stage of the type rotatable on a stage support of a microscope and which comprises a stage plate having a hub portion rotatably journaled in said stage support, a slide slidably mounted on said plate, said slide having a main portion and an extension portion the surface of which is below that of the main portion of said slide, a second slide slidably mounted on said extension portion for movement in a direction transverse to that of the first slide, said second slide having its upper surface substantially flush with the upper surface of said main portion of the first slide, specimen holding means on the second slide, said stage support, plate and first slide each provided with an opening for the passage of light through said stage, gear means on the second slide, a ring gear, gib means secured to said first slide in supporting relation to said ring gear whereby to rotatably support said ring gear in operative relation with the gear means on said second slide to move the latter in accordance with the rotation of the ring gear, rack means carried by said plate, and independently operable pinion means carried by said first slide in operating relation to said ring gear and to said rack whereby to selectively cause the movement of a slide on the actuation of its respective pinion means.

8. A revolving microscope stage of the type rotatably mounted on a stage support of a microscope, said stage comprising a stage plate rotatably supported on said stage support, a slide slidable on said stage plate, a second slide slidable on said first slide in a direction transverse to the movement of the first slide, specimen holding means on the second slide, said stage support, plate and first slide having an opening providing a light passageway through said stage, gear means on said second slide, other gear means rotatably carried by the first slide in operative engagement with the gear means on said second slide whereby to move the latter in accordance with the rotation of said second mentioned gear means, separate and independently operable pinion means rotatably carried by said first slide in operative relation to said second mentioned gear means at positions diametrically opposed to each other, said pinion means positioned in operating relation to said second mentioned gear means to cause movement between the slides to occur in the same relative direction on rotation of either pinion means in the same direction when either of such means is positioned on the same side of the microscope following rotation of said stage, a rack on said plate, other pinion means concentric with said first named pinion means and also rotatably carried by said first slide, said second pinion means in operating relation to said rack whereby to cause movement of the first slide in accordance with the rotation of said second pinion means.

9. In a microscope having a stand, a centrally apertured stage supported by said stand and means on the stage to hold an object being examined, the combination of a slide support, a slide member mounted on said slide support for rectilinear sliding movement, specimen holding means carried by said slide member, gear teeth carried by said slide member, a circular member rotatably carried by said slide support and having an opening concentric with the aperture in the stage, gear teeth on said circular member in operative engagement with the gear teeth on said slide member, other gear teeth on said circular member, and drive means carried by said slide support and having a drive gear in operative engagement with the second mentioned gear teeth on said circular member whereby to rotate the latter to cause the movement of the slide member.

10. In a microscope the combination of a stand, a stage rotatably supported by said stand, said stage having a centrally disposed opening, a specimen carrying slide member movably supported by the stage for rectilinear movement, an annular gear member rotatably carried by the stage and having an opening which is substantially concentric with the opening in the stage, gear teeth associated with the slide member, said annular gear member having teeth which coact with the gear teeth associated with the slide member whereby rotation of the annular gear member will cause rectilinear movement of the slide member, and means for rotating said annular gear member.

11. In a microscope the combination of a stand, a centrally apertured stage rotatably supported by the stand, a specimen slide member movably supported by the stage for rectilinear movement, gear teeth associated with the slide member, an annular member rotatably mounted on the stage with its opening in alignment with the aperture of the stage, said annular member having gear teeth operatively engaging the teeth associated with the slide member whereby rotation of the annular member moves the slide member, means for rotating the annular member comprising other gear teeth on the annular member, and a plurality of drive gears rotatably mounted on opposite sides of the stage aperture, said drive gears being in cooperative engagement with said other gear teeth on the annular member.

EDWARD F. FLINT.